US011087340B1

(12) United States Patent
Anderson et al.

(10) Patent No.: US 11,087,340 B1
(45) Date of Patent: Aug. 10, 2021

(54) SYSTEMS AND METHODS FOR CONFIGURING CONVERGED INFRASTRUCTURE COMPONENTS

(71) Applicant: VCE Company, LLC, Richardson, TX (US)

(72) Inventors: Steve J. Anderson, Overland Park, KS (US); Michael W. Plate, Maynard, MA (US); Steven Keating, Dublin (IE)

(73) Assignee: EMC IP Holding Company LLC, Round Rock, TX (US)

( * ) Notice: Subject to any disclaimer, the term of this patent is extended or adjusted under 35 U.S.C. 154(b) by 533 days.

(21) Appl. No.: 14/109,350

(22) Filed: Dec. 17, 2013

(51) Int. Cl.
| G06Q 30/02 | (2012.01) |
| G06F 15/16 | (2006.01) |
| G06Q 10/06 | (2012.01) |
| G06F 9/44 | (2018.01) |

(52) U.S. Cl.
CPC ......... *G06Q 30/0203* (2013.01); *G06F 15/16* (2013.01); *G06F 9/44* (2013.01); *G06Q 10/06* (2013.01); *G06Q 10/06315* (2013.01)

(58) Field of Classification Search
None
See application file for complete search history.

(56) References Cited

U.S. PATENT DOCUMENTS

| 6,629,081 | B1* | 9/2003 | Cornelius | G06Q 20/04 |
| | | | | 705/30 |
| 7,020,697 | B1* | 3/2006 | Goodman | G06Q 10/06 |
| | | | | 709/223 |
| 7,047,279 | B1* | 5/2006 | Beams | G06Q 10/10 |
| | | | | 706/11 |
| 7,403,901 | B1* | 7/2008 | Carley | G06F 17/30306 |
| | | | | 705/2 |
| 8,583,769 | B1* | 11/2013 | Peters | G06F 9/541 |
| | | | | 709/221 |
| 8,954,309 | B2* | 2/2015 | B'Far | G06F 11/302 |
| | | | | 703/13 |

(Continued)

OTHER PUBLICATIONS

Soldatos, John, Martin Serrano, and Manfred Hauswirth. "Convergence of utility computing with the internet-of-things." 2012 Sixth International Conference on Innovative Mobile and Internet Services in Ubiquitous Computing. IEEE, 2012. (Year: 2012).*

*Primary Examiner* — Brian M Epstein
*Assistant Examiner* — Darlene Garcia-Guerra
(74) *Attorney, Agent, or Firm* — Polsinelli PC (57) ABSTRACT

Implementations described and claimed herein provide systems and methods for configuring one or more components of a converged infrastructure for a customer. In one implementation, a survey including configuration parameters for the one or more components of the converged infrastructure is received. The configuration parameters are collected in the survey using a survey tool accessible with a user device over a network. The configuration parameters are based on input from the customer including customer specifications for the converged infrastructure. The configuration parameters are validated, and at least one script for the one or more components is generated. The script includes instructions for configuring the one or more components based on the validated configuration parameters.

12 Claims, 6 Drawing Sheets

(56) References Cited

U.S. PATENT DOCUMENTS

| | | | |
|---|---|---|---|
| 2002/0049642 A1* | 4/2002 | Moderegger | G06Q 30/0611 705/26.3 |
| 2002/0198967 A1* | 12/2002 | Iwanojko | H04L 41/0816 709/220 |
| 2003/0155415 A1* | 8/2003 | Markham | G06Q 10/00 235/376 |
| 2003/0167455 A1* | 9/2003 | Iborra | G06F 8/30 717/105 |
| 2003/0172145 A1* | 9/2003 | Nguyen | G06Q 10/10 709/223 |
| 2004/0267911 A1* | 12/2004 | Alam | G06F 8/60 709/220 |
| 2005/0085937 A1* | 4/2005 | Goodwin | G06F 8/60 700/107 |
| 2005/0114829 A1* | 5/2005 | Robin | G06Q 10/06 717/101 |
| 2005/0193269 A1* | 9/2005 | Haswell | G06F 11/3684 714/38.13 |
| 2005/0198563 A1* | 9/2005 | Kristjansson | G06F 17/243 715/224 |
| 2006/0126530 A1* | 6/2006 | Fuhrmann | H04L 41/0869 370/252 |
| 2006/0161444 A1* | 7/2006 | Lubrecht | G06F 8/00 705/7.41 |
| 2007/0064603 A1* | 3/2007 | Chen | H04L 41/0806 370/230 |
| 2007/0180490 A1* | 8/2007 | Renzi | G06F 21/577 726/1 |
| 2007/0192715 A1* | 8/2007 | Kataria | G06Q 10/06 715/764 |
| 2007/0240154 A1* | 10/2007 | Gerzymisch | G06F 8/61 717/174 |
| 2008/0147675 A1* | 6/2008 | Engehausen | G06F 8/60 |
| 2008/0268904 A1* | 10/2008 | Tanaka | H04M 1/7253 455/556.1 |
| 2009/0024663 A1* | 1/2009 | McGovern | G06F 21/577 |
| 2009/0280907 A1* | 11/2009 | Larsen | G06F 8/60 463/42 |
| 2010/0257507 A1* | 10/2010 | Warren | G06F 8/40 717/106 |
| 2010/0271975 A1* | 10/2010 | Qiu | H04L 41/0853 370/254 |
| 2011/0088011 A1* | 4/2011 | Ouali | G06F 8/10 717/105 |
| 2012/0203657 A1* | 8/2012 | Jacob Sushil | G06Q 50/01 705/26.5 |
| 2013/0110736 A1* | 5/2013 | Savage | G06Q 10/1091 705/322 |
| 2013/0204948 A1* | 8/2013 | Zeyliger | G06F 9/44505 709/206 |
| 2013/0346267 A1* | 12/2013 | Portwig | G06Q 10/0631 705/32 |
| 2014/0026131 A1* | 1/2014 | Ravi | G06F 9/44505 717/177 |
| 2014/0101467 A1* | 4/2014 | Jubran | H04L 41/0856 713/310 |
| 2014/0109094 A1* | 4/2014 | Datla | G06F 9/46 718/100 |
| 2014/0180938 A1* | 6/2014 | Domke | G06Q 30/018 705/317 |
| 2014/0250215 A1* | 9/2014 | Bowen | G06F 21/57 709/223 |
| 2014/0278623 A1* | 9/2014 | Martinez | G06Q 10/06 705/7.12 |

\* cited by examiner

SYSTEMS AND METHODS FOR CONFIGURING CONVERGED INFRASTRUCTURE COMPONENTS

TECHNICAL FIELD

Aspects of the present disclosure relate to configuration of various computing components, among other functions, and more particularly to configuring one or more components of a converged infrastructure.

BACKGROUND

Widespread adoption of virtualization is rapidly revolutionizing the ways information technology ("IT") departments procure, implement, and operate technology. As such, converged infrastructures provide dynamic pools of computing resources that are intelligently provisioned and managed to address changing demands of customers. For example, a converged infrastructure may include pools of compute, storage, and network devices that may be shared and accessed by multiple applications. Integrating, validating, and managing such components is often a drain on IT resources. Accordingly, pre-configured, pre-integrated, and validated infrastructures are highly desirable to customers.

However, collecting and consuming information needed to provide pre-configured, pre-integrated, and validated infrastructures to customers is generally challenging and inefficient. Often, multiple exchanges with the customer are needed to acquire the information, and a quality analysis of the information is typically manually performed. As such, the quality analysis is often inconsistent and disjointed. Further, missing or incorrect information or other problems with the information often are not discovered until after configuration of the converged infrastructure has begun, thereby increasing time and expenses associated with the configuration to correct such errors.

SUMMARY

Implementations described and claimed herein address the foregoing problems, among others, by providing systems and methods for configuring one or more components of a converged infrastructure for a customer. In one implementation, a survey including configuration parameters for the one or more components of the converged infrastructure is received. The configuration parameters are collected in the survey using a survey tool accessible with a user device over a network. The configuration parameters are based on input from the customer including customer specifications for the converged infrastructure. The configuration parameters are validated, and at least one script for the one or more components is generated. The script includes instructions for configuring the one or more components based on the validated configuration parameters.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for configuring one or more components of a converged infrastructure for a customer. A converged infrastructure generally refers to a specific type of computing infrastructure that packages multiple, heterogeneous computing components into a single, optimized computing platform. Converged infrastructures are often used in the IT context in an attempt to centralize, consolidate, and optimize the management of IT computing components and resources. Typical computing components include servers, storage devices, virtualization components, network components, and the like. Additionally, converged infrastructures may include application software for the management, automation, and/or orchestration of dynamic pools of computing components. The pooled computing components may be utilized, for example, as a service, at one or more user devices over a network. In one particular example, the converged infrastructure is a Vblock™ Systems converged infrastructure governed by management software (e.g., VCE Vision™ Intelligent Operations) that provides an integrated set of software tools for managing various computing components.

Generally, providing a pre-configured, pre-integrated, and validated converged infrastructure for the customer involves obtaining information from the customer, including the customer's specifications, and configuring the components of the converged infrastructure in accordance with the documented information. In one aspect, a survey tool provides a survey, such as a Logical Configuration Survey ("LCS"), to a customer for completion. The survey tool solicits information from the customer needed to configure a converged infrastructure to the customer's specifications. As the customer completes the survey, the survey tool may automatically perform a Quality Analysis ("QA") of the information provided. Based on the QA of the information, the survey tool prompts the customer to remedy any identified errors and/or displays configuration parameters for the converged infrastructure according to the customer's specifications. Once the survey is completed, the survey, including configuration parameters, is exported to an automation tool to further validate the data collected in the survey and to generate scripts specific to the survey to configure the components of the converged infrastructure. Through the QA performed by the survey tool and the validation performed by the automation tool, higher quality configuration parameters are provided to generate the scripts for the configuration of the components, resulting in a consistently high quality configuration of the converged infrastructure in accordance with the customer's specifications.

The various systems and methods disclosed herein provide for configuring one or more components of a converged infrastructure. It will be appreciated that, although some of the example implementations described herein involve a customer providing information for the configuration of the converged infrastructure, the presently disclosed technology may be utilized by various parties to configure a converged infrastructure for a variety of purposes.

Figure 1:
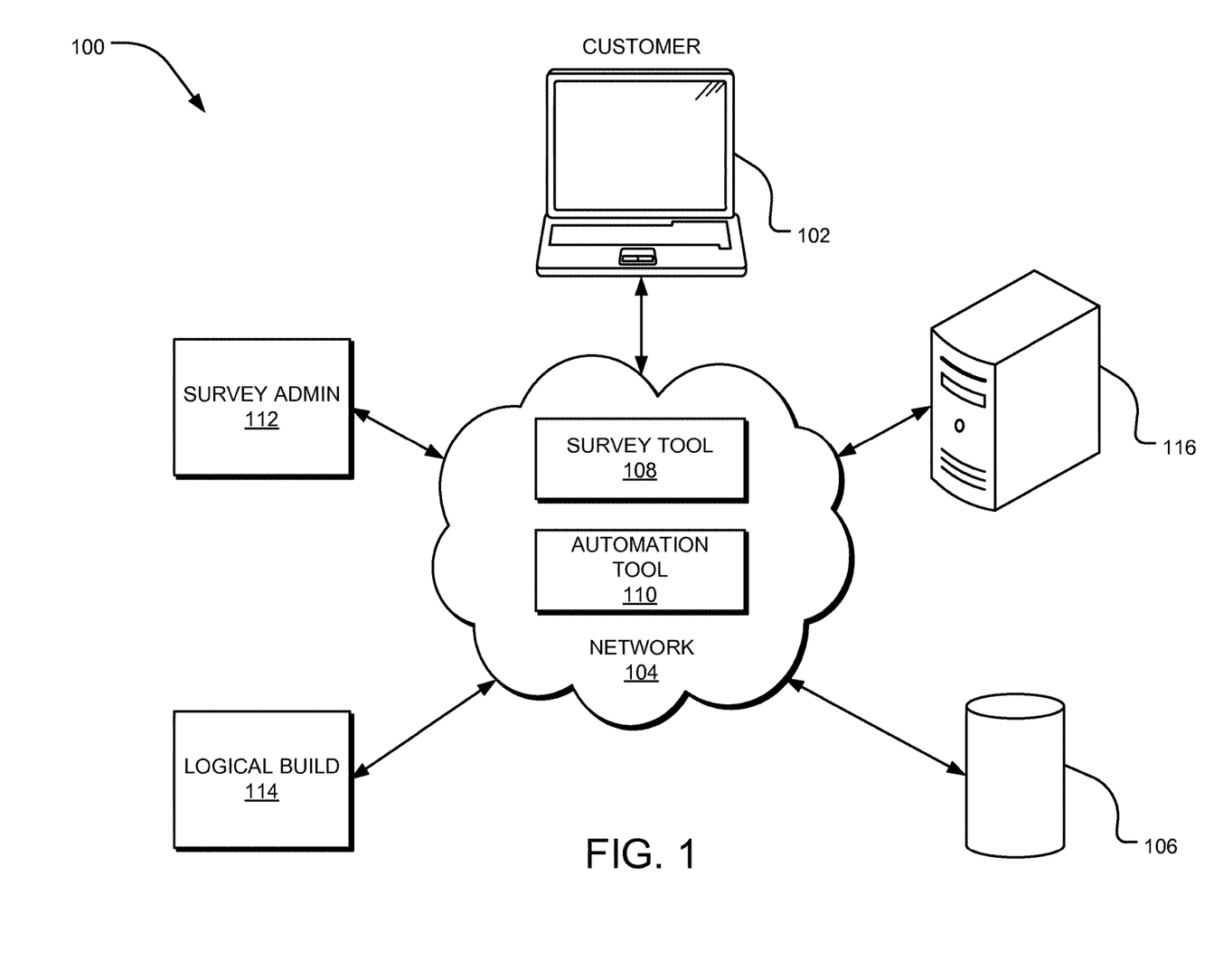
FIG. 1 illustrates an example system for configuring one or more components of a converged infrastructure for a customer, according to one embodiment.

For a detailed description of an example system 100 for configuring one or more components of a converged infrastructure for a customer 102, reference is made to FIG. 1. As depicted in FIG. 1, the system 100 may be implemented in a network environment. In such an environment, a network 104, which may be, without limitation, the Internet, an Intranet, an Ethernet network, a wired network, a wireless network, or the like, is used by one or more computing and/or data storage devices (e.g., one or more databases 106) for implementing the system 100.

In one implementation, the system 100 includes a survey tool 108 and an automation tool 110 for obtaining information from the customer 102, including the customer's specifications, and generating one or more scripts for configuring the components of the converged infrastructure in accordance with the documented information. The survey tool 108 and the automation tool 110 may include or otherwise involve, for example, one or more websites, software applications, interfaces, storage devices, computing components, or the like. The survey tool 108 and the automation tool 110 may be automatically updated via the network 104 or other software updating mechanisms, ensuring that current versions are utilized. To further ensure current versions are utilized and for security, access to the survey tool 108 and/or the automation tool 110 may be restricted to authorized users, in some cases for a predetermined time period after which authorization expires. Furthermore, users may be provided varying levels of access to different features of the survey tool 108, the automation tool 110, and/or the associated data.

A user (e.g., the customer 102, a survey administrator 112, member(s) of a Logical Build team 114, or other authorized personnel or groups) may run the survey tool 108 and/or the automation tool 110 on a user device or access and interact with the tools 108 and/or 110 using a user device communicatively connected to the network 104. The user device is generally any form of computing device capable of interacting with the network 104, such as a personal computer, work station, terminal, mobile computer, mobile device, smartphone, tablet, a multimedia console, or the like.

A server 116 hosts the survey tool 108 and/or the automation tool 110. In one implementation, the server 116 also hosts a website or an application that users may visit to access the survey tool 108 and/or the automation tool 110. The server 116 may be a single server, a plurality of servers with each such server being a physical server or a virtual machine, or a collection of both physical servers and virtual machines. In another implementation, a cloud hosts one or more components of the system 100. The user devices, the server 116, and other resources connected to the network 104, such as the one or more databases 106, may access one or more other servers to access one or more websites, applications, web services interfaces, storage devices, computing devices, etc. that are used to configure the components of the converged infrastructure for the customer 102. The server 116 may also host a search engine that the survey tool 108 and/or the automation tool 110 use for accessing, searching for, and modifying information relevant to the configuration of the components of the converged infrastructure for the customer 102.

In one implementation, a survey administrator 112 oversees a completion of a survey by the customer 102. To complete the survey, the customer 102 is provided access to the survey tool 108. For example, the survey administrator 112 may provide the customer 102 with login information, or the survey tool 108 may automatically generate and provide login information to the customer 102.

The survey tool 108 solicits information from the customer 102 needed to configure the converged infrastructure to the specifications of the customer 102. For example, the survey may include a plurality of fields, questions, or the like, and/or the survey may request documentation detailing various aspects of the specifications of the customer 102. Any changes made to the information collected in the survey after the Logical Build team 114 begins configuring the components of the converged infrastructure or during on-site implementation of the converged infrastructure increases the time, resources, and costs expended to deliver the converged infrastructure to the customer 102. As such, the survey tool 108 assists the customer 102 in completing the survey. For example, the survey tool 108 may provide an explanation of a field in the survey when the customer 102 hovers a cursor over the field in a user interface of the survey tool 108, or the survey tool 108 may provide visual cues informing the customer 102 of required and/or optional fields. The survey tool 108 may provide a variety of other tools for providing tips, additional information, and other resources. Further, the survey administrator 112 may be available to provide assistance to the customer 102.

To further provide additional assistance to the customer 102 to increase the accuracy of the survey and reduce the time and resources expended in completing the survey, the survey tool 108 prompts the customer 102 to provide input relevant to a configuration of the converged infrastructure according to the specifications of the customer 102. In one implementation, the survey tool 108 formats the survey and/or pre-populates portions of the survey based on a Bill of Material ("BOM") for the converged infrastructure for the customer 102. Further, as the customer 102 provides input into the survey, the survey tool 102 may automatically complete portions of the survey or modify the information solicited based on the input from the customer 102.

As the customer 102 completes the survey, the survey tool 108 automatically performs a QA of the input provided by the customer 102. In one implementation, the survey tool 108 may automatically verify a format of the input to determine whether valid information is provided. For example, in verifying a format of input relating to a Virtual Local Area Network ("VLAN") identification, the survey tool 108 may determine whether the input is a number falling within a range of proper VLAN identification numbers.

In one implementation, the survey tool 108 automatically provides feedback to the customer 102 based on the QA of the input. The survey tool 108 may provide feedback where the QA indicates an error present in the input provided by the customer 102, such as missing information, incorrect information, an invalid format of the information, or the like. The survey tool 108 automatically provides feedback to the customer 102 prompting the customer 102 to remedy the identified errors. The survey tool 108 may additionally provide feedback where the QA does not indicate the presence of any errors in the input provided by the customer 102. For example, the survey tool 108 may provide feedback confirming a format of the input is valid. Further, in one implementation, as the customer 102 completes the survey, the survey tool 108 updates and displays configuration parameters for the converged infrastructure according to the input provided by the customer 102.

Once the survey is completed and passes the QA performed by the survey tool 108, the survey contains configuration parameters for the components of the converged infrastructure based on the specifications of the customer 102. In one implementation, the survey administrator 112 reviews the completed survey and contacts the customer 102 to obtain acknowledgement of the completion of the survey for submission to the Logical Build team 114. For example, the survey administrator 112 may obtain written authorization from the customer 102 to use the completed survey to configure the components of the converged infrastructure and written confirmation that the customer 102 considers the survey to be accurate, complete, and suitable for configuration of the converged infrastructure in accordance with the specifications of the customer 102. Further, the survey administrator 112 may confirm that the customer 102 understands that any changes made to any of the information contained in the survey after submission to the Logical Build team 114 may impact the delivery of the converged infrastructure. In another implementation, the survey tool 108 automatically prompts the customer 102 to review the completed survey and provide such written acknowledgments.

Timeliness of the customer 102 in acknowledging the completed survey for submission to the Logical Build team 114 impacts the overall schedule for delivering the converged infrastructure and increases the risk of the customer 102 utilizing outdated tools or information in providing information needed to configure the converged infrastructure. As such, in one implementation, the survey tool 108 assists the customer 102 in managing deadlines for providing and correcting the input. For example, the survey tool 108 may track the progress in completing the survey and document and alert the customer 102 about upcoming deadlines or outstanding action items, such as remedying an error identified during the QA, completing portions of the survey, confirming information generated by the survey tool 108, providing an acknowledgment, or the like. Similarly, the survey tool 108 may provide a time sensitive survey to the customer 102 that expires after a predefined time period to ensure the customer 102 is working with a current version of the survey. Accordingly, the survey tool 108 minimizes the time and resources expended in obtaining quality information from the customer 102 needed to configure the components of the converged infrastructure according to the specifications of the customer 102.

In one implementation, once the survey is completed and approved for submission to the Logical Build team 114, the survey, including configuration parameters, is exported to the automation tool 110 to validate the survey and to generate scripts specific to the survey to configure the components of the converged infrastructure. Stated differently, the automation tool 110 receives the survey, which includes configuration parameters for the components of the converged infrastructure in accordance with the specifications of the customer 102. The automation tool 110 validates the configuration parameters. In one implementation, the automation tool 110 validates each of a plurality of fields included in the configuration parameters. For example, the automation tool 110 may verify a format of each of the fields to confirm the configuration parameters are valid. Further, the automation tool 110 may analyze the configuration parameters to determine whether the configuration parameters for each of the components is suitable for the converged infrastructure for the customer 102. For example, the automation tool 110 may determine whether the configuration parameters are sufficient to provide components that will operate in the converged infrastructure to the satisfaction of the customer 102. In one implementation, the automation tool 110 validates BOM information and the configuration parameters for the converged infrastructure for the customer 102.

For a final check to ensure the validated configuration parameters are sufficient for the configuration of the components of the converged infrastructure, member(s) of the Logical Build team 114 may review the configuration parameters and approve the commencement of the configuration of the components. In one implementation, once the validated configuration parameters are approved, the automation tool 110 generates one or more scripts for the components of the converged infrastructure based on the validated configuration parameters and/or the BOM information. The scripts include configuration instructions for at least one of the components of the converged infrastructure, including, without limitation, various network, virtualization, storage, and/or computing components. Through the QA performed by the survey tool 108 and the validation performed by the automation tool 110, higher quality configuration parameters are provided to generate the scripts for the configuration of the components, resulting in a consistently high quality configuration of the converged infrastructure in accordance with the customer's specifications. In one implementation, the generated scripts are stored in a central repository, such as the database 106, to ensure current scripts are available for configuring components of the converged infrastructure. The scripts may be applied to the one or more components to configure the components based on the configuration instructions. Once the components are configured, a pre-configured, pre-integrated, and validated converged infrastructure may be delivered to the customer 102.

Figure 2:
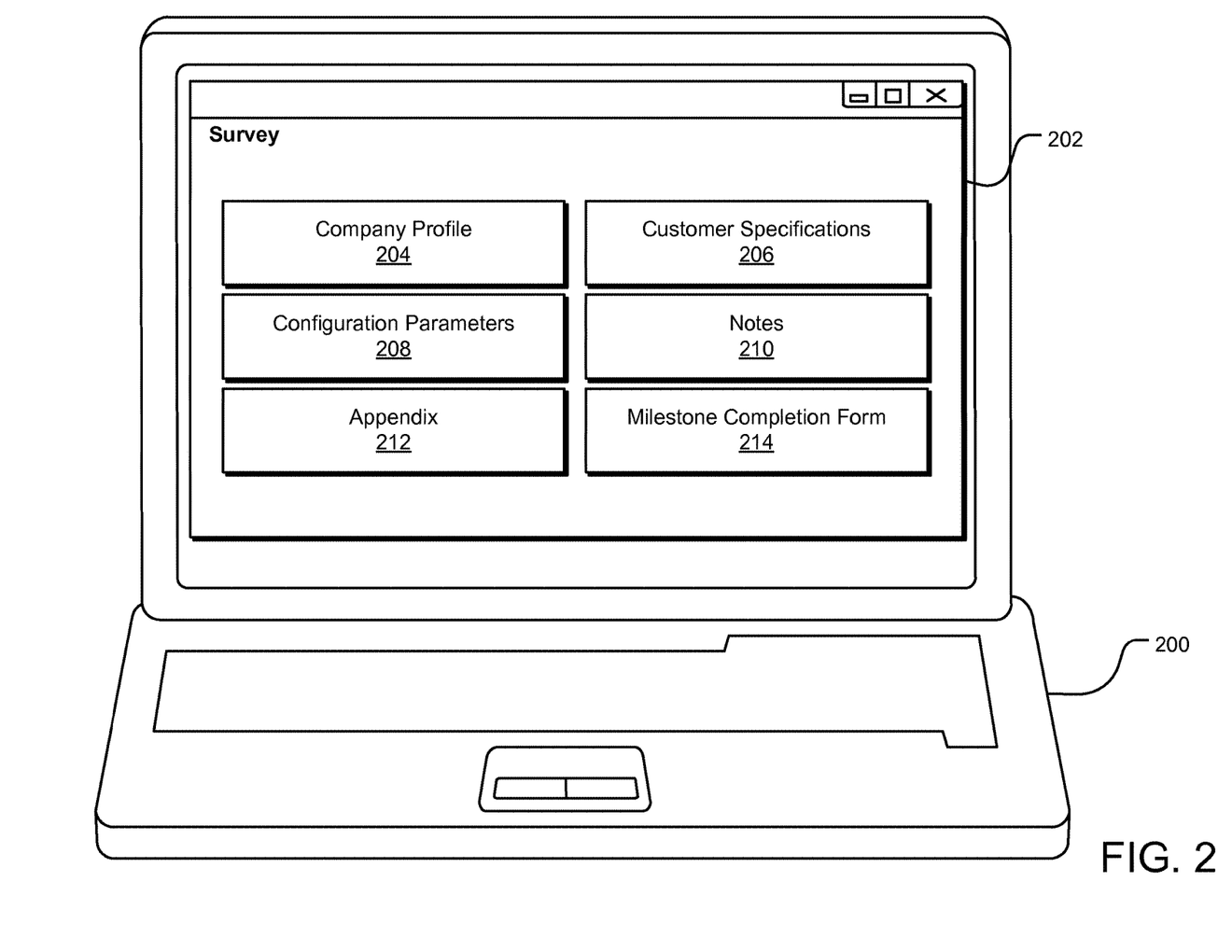
FIG. 2 illustrates an example user interface displaying a survey generated by a survey tool for determining configuration parameters, according to one embodiment.
Figure 3:
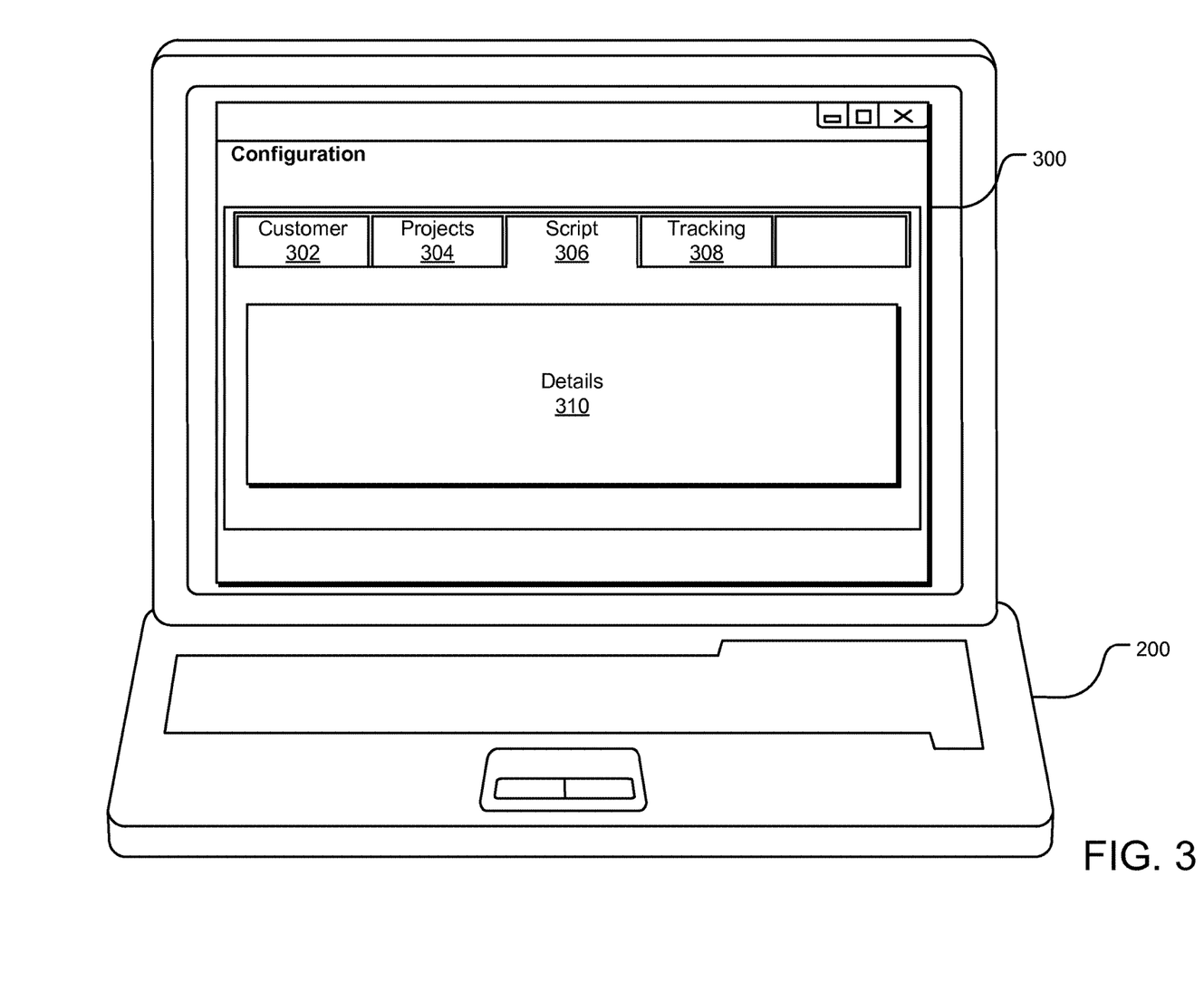
FIG. 3 shows an example user interface displaying a configuration window generated by an automation tool, according to one embodiment.

FIGS. 2-3 show an example user interface displayed on a user device 200 through which access to and interactions with the survey, scripts, and/or other information are controlled with the survey tool 108 and/or the automation tool 110. It will be appreciated by those skilled in the art that such depictions are exemplary only and not intended to be limiting.

FIG. 2 illustrates an example user interface generated by the survey tool 108, the user interface displaying a survey 202. In the implementation shown in FIG. 2, the survey 202 solicits input corresponding to a company profile 204 and customer specifications 206. The company profile 204 may include one or more fields or questions about a customer, personnel assigned to oversee the delivery of the converged infrastructure to the customer, and/or preferences of the customer. For example, the information solicited with respect to the company profile 204 may include, without limitation, a customer name, a customer site address, an identification of the project, a project manager assigned to the customer, a name of an architect that worked with the customer to design the converged infrastructure for the customer, a summary of any general details of the converged infrastructure, and any exceptions to a general configuration of the converged infrastructure.

The customer specifications 206 may include one or more fields or questions about the specifications of the customer 102 for the converged infrastructure. For example, the customer specifications 206 may include, without limitation, general converged infrastructure information, an implementation profile, system platforms and VLAN information, customer production VLAN or Virtual Storage Area Network ("VSAN") information, device host name information, customer network information, production and management uplinks, customer domain information, domain name service ("DNS") information, Simple Network Management Protocol ("SNMP") information, syslog server information, Network Time Protocol ("NTP") information, security settings, management virtual machine host name and Information Protocol ("IP") address settings, virtualization server and cluster information, Unified Infrastructure Management ("UIM") host and configuration information, UIM grade information, UIM layout information, pool configuration information, data store information, customer support information, image and license information and preferences, a chassis layout, and details regarding storage drive counts and intended use for each drive. In one implementation, configuration parameters 208 may be displayed based on the information provided with respect to the customer specifications 206.

In the implementation shown in FIG. 2, the survey 202 tracks notes 210, provides an appendix 212, and includes a milestone completion form 214. The notes 210 may be used to provide instruction to the customer for providing documentation or other files solicited by the survey tool 108, for example, using the customer specifications 206, or otherwise associated with the configuration of the converged infrastructure. For example, the notes 210 may include instructions for using a File Transfer Protocol ("FTP") site to upload files. Further, the notes 210 may be used to track or record questions from the customer. The appendix 212 may attach diagrams or other documentation explaining various aspects of the converged infrastructure or the survey 202.

The milestone completion form 214 tracks progress in completing, approving, and submitting the survey 202. For example, the milestone completion form 214 may include a track and/or attach written authorization from the customer to use the completed survey 202 to configure the components of the converged infrastructure and written confirmation that the customer considers the survey to be accurate, complete, and suitable for configuration of the converged infrastructure in accordance with the specifications of the customer. Further, the milestone completion form 214 may include a mechanism for the customer to acknowledge that it is understood that any changes made to any of the information contained in the survey after submission to the Logical Build team may impact the delivery of the converged infrastructure.

It will be understood that the input solicited, information displayed, and the like shown and described with respect to FIG. 2 may be presented as one or separate windows or pages or collected using one or more websites, pages, interfaces, or the like.

Turning to FIG. 3, an example user interface generated by the automation tool 110 is shown, the user interface displaying a configuration window 300. In the implementation shown in FIG. 3, the configuration window 300 includes a customer tab 302, a projects tab 304, a script tab 306, and a tracking tab 308. Selection of one of the tabs 302-308 displays associated details 310. The tabs 302-308 may include drop down menus for simplified navigation.

The customer tab 302 permits a user to view a project for a customer, edit various aspects of project information (e.g., customer VLAN information, chassis layout information, cluster information, or the like), or retrieve scripts associated with the project. The customer tab 302 may include an option to collect all scripts for a project and present an archive file (e.g., zip file) for download.

The projects tab 304 permits the user to filter projects. For example, the projects tab 304 may filter the projects based on a phase of the project (e.g., in QA phase, Logical Build phase, complete). Further, the projects tab 304 may include a new project option to load a new survey and a new project (default) option to load a new survey with default values. The script tab 306 provides access to the automation tool 110 and associated functions or resources. The tracking tab 308 provides a tracking database to track script issues or recommendations or other trends associated with the configuration of converged infrastructures.

Figure 4:
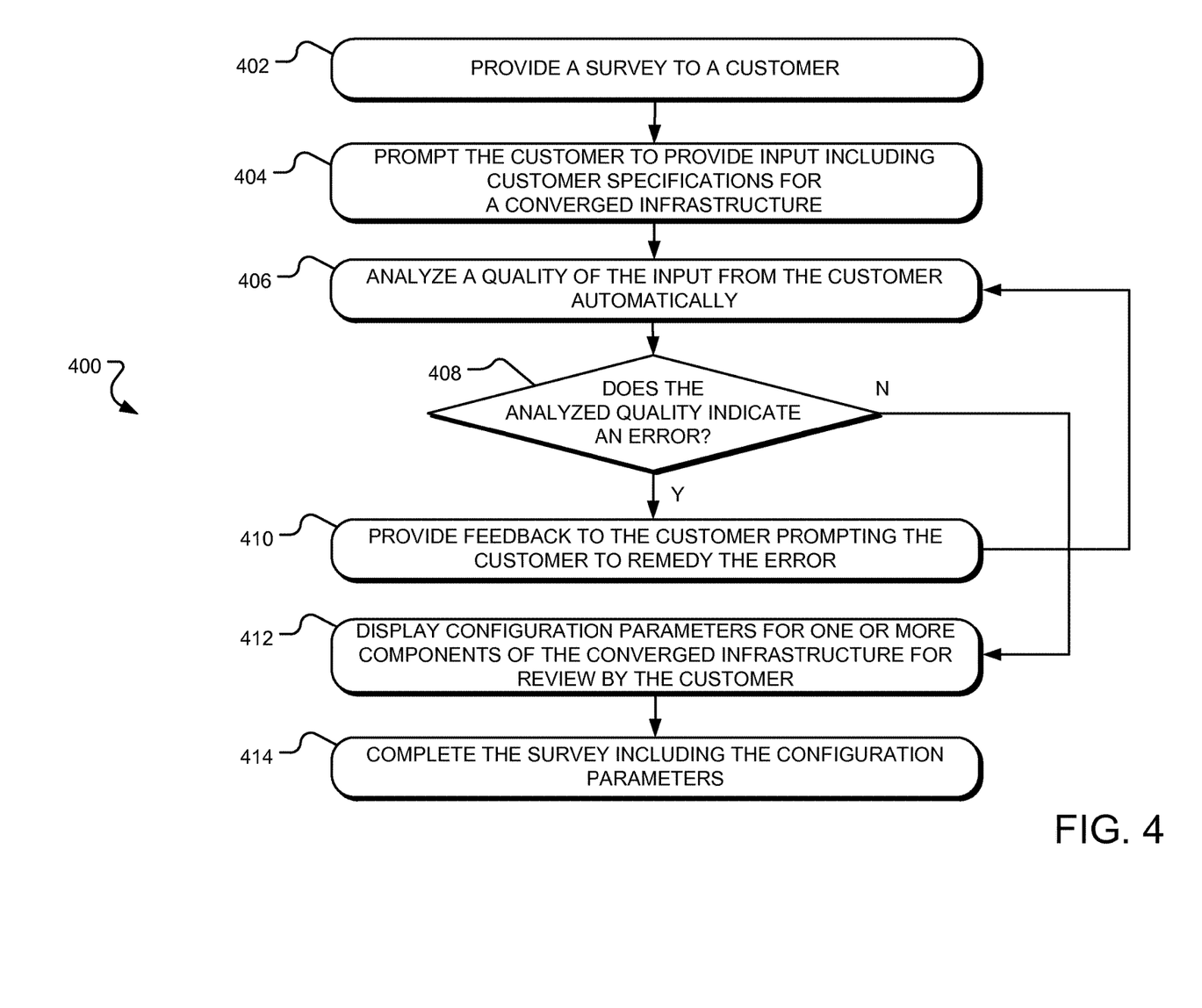
FIG. 4 illustrates example operations for determining configuration parameters for one or more components of a converged infrastructure for a customer, according to one embodiment.

FIG. 4 illustrates example operations 400 for determining configuration parameters for one or more components of a converged infrastructure for a customer. In one implementation, a providing operation 402 provides a survey to a customer, and a prompting operation 404 prompts the customer to provide input, including customer specifications for a converged infrastructure for the customer.

An analyzing operation 406 automatically analyzes a quality of the input provided by the customer. The analyzing operation 406 makes a determination 408 whether the analyzed quality of the input indicates an error. If the determination 408 identifies an error, a providing operation 410 provides feedback to the customer prompting the customer to remedy the error. The analyzing operation 406 and providing operations 410 may be repeated until the determination 408 does not identify errors.

If the determination 408 does not identify any errors, a displaying operation 412 displays configuration parameters for one or more components of the converged infrastructure for review and approval by the customer. If the customer approves the configuration parameters, a completing operation 414 completes the survey.

Figure 5:
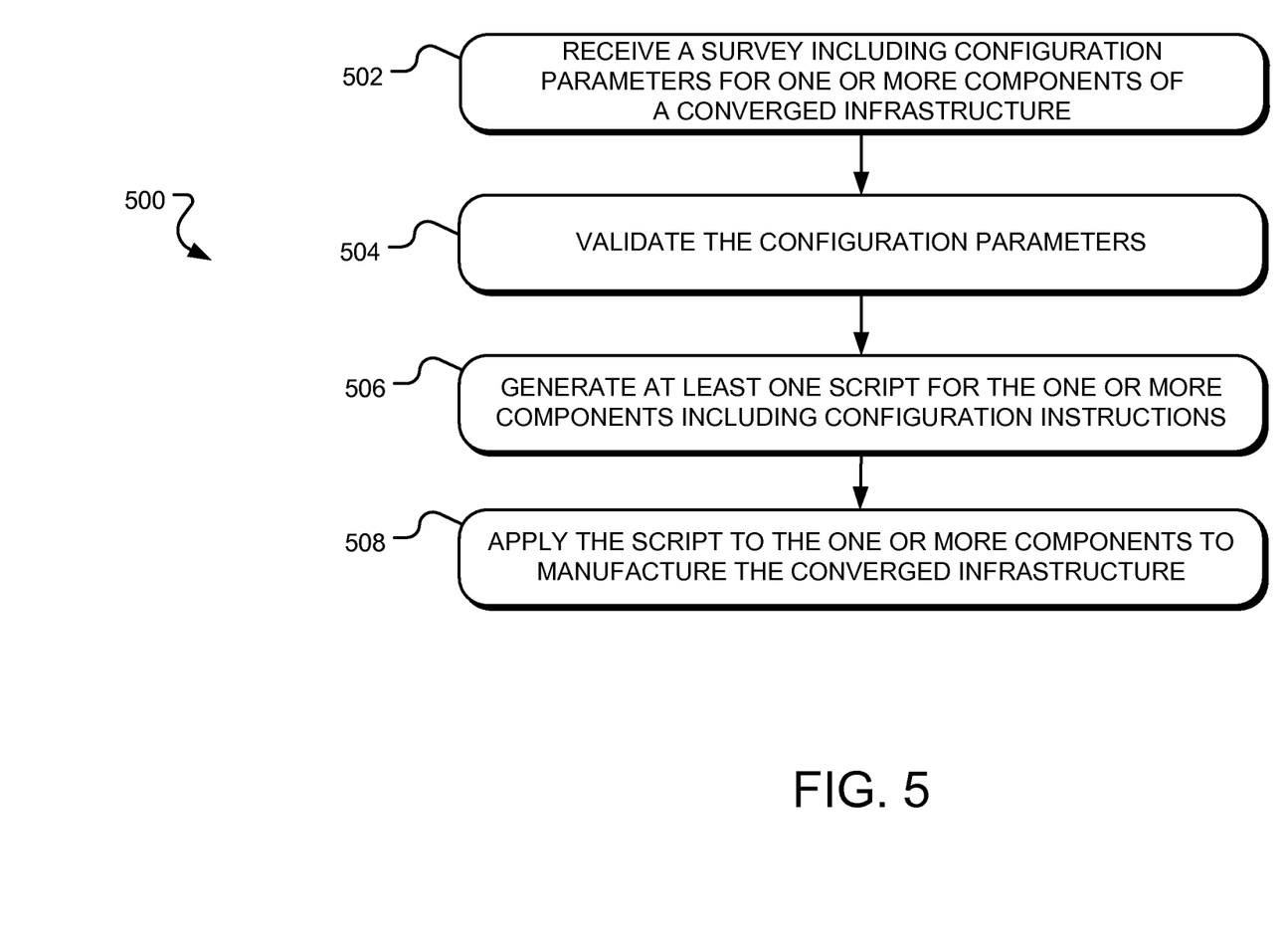
FIG. 5 illustrates example operations for configuring one or more components of a converged infrastructure, according to one embodiment.

Turning to FIG. 5, example operations 500 for configuring one or more components of a converged infrastructure are shown. In one implementation, a receiving operation 502 receives a survey including configuration parameters for one or more components of a converged infrastructure. A validating operation 504 validates the configuration parameters. For example, the validating operation 504 may automatically validate the configuration parameters by verifying a format of at least one field included in the configuration parameters.

Once the configuration parameters are validated, a generating operation 506 generates at least one script for the one or more components. In one implementation, the script includes configuration instructions for configuring the one or more components in accordance with customer specifications and/or converged infrastructure standards. In one implementation, the survey is stored in or uploaded to a database, and the generating operation 506 references the database to extract the customer specifications. The generating operation 506 may insert the customer specifications into a template to generate a script with customer specific configurations. An applying operation 508 applies the script to the components to manufacture the converged infrastructure. In one implementation, the applying operation 508 applies the script(s): for cell router configuration; to configure network components; to configure compute components; to configure storage components; and/or the like.

Figure 6:
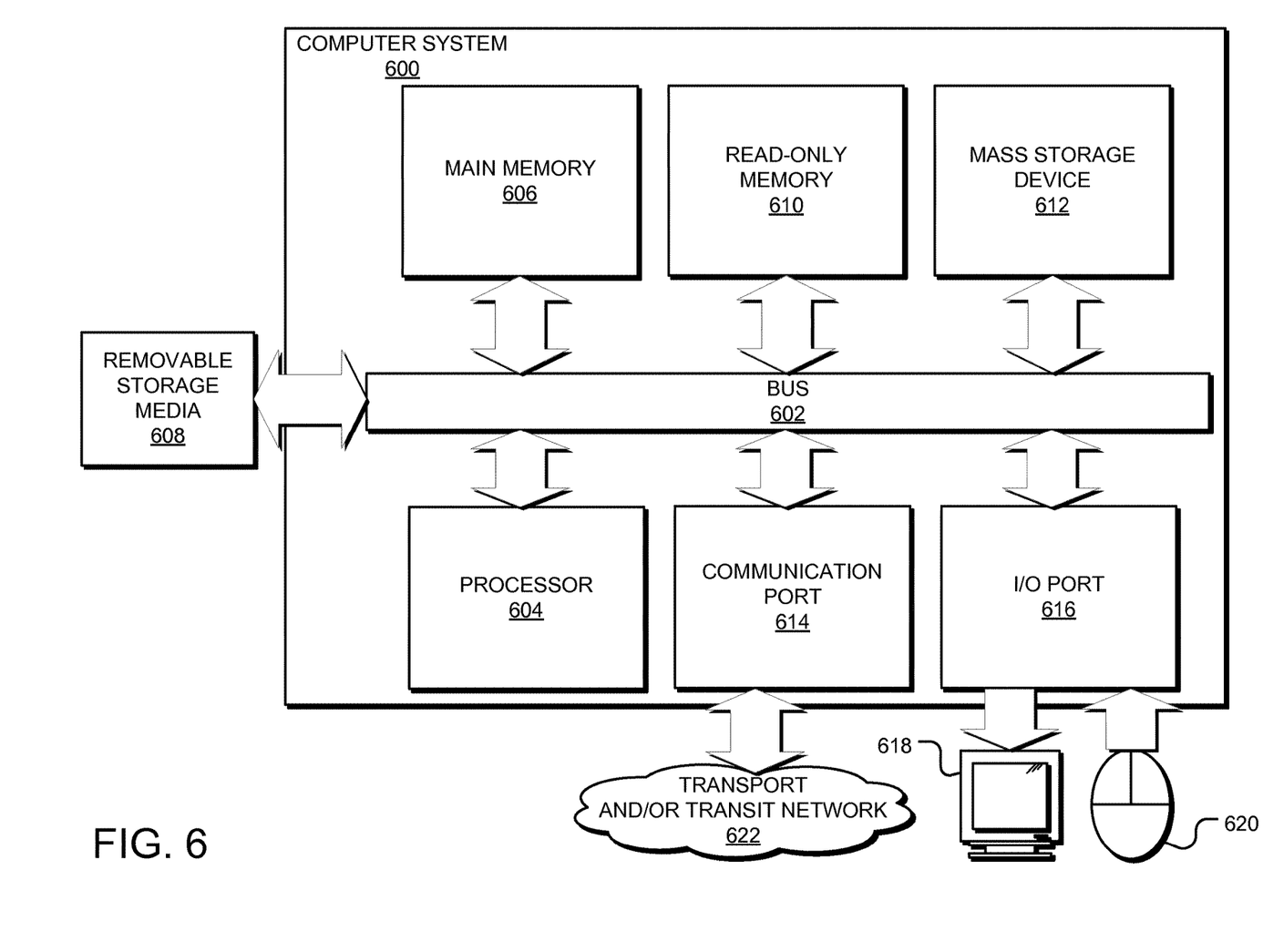
FIG. 6 shows an example computing system that may implement various systems and methods discussed herein, according to one embodiment.

FIG. 6 is an example computing system 600 that may implement various systems and methods discussed herein. The computer system 600 includes one or more computing components in communication via a bus 602. In one implementation, the computing system 600 includes one or more processors 604. The processor 604 may include one or more internal levels of cache (not shown) and a bus controller or bus interface unit to direct interaction with the bus 602. The processor 604 may include the survey tool 108 and/or the automation tool 110 and specifically implements the various methods discussed herein. Main memory 606 may include one or more memory cards and a control circuit (not shown), or other forms of removable memory, and may store various software applications including computer executable instructions, that when run on the processor 604, implement the methods and systems set out herein. Other forms of memory, such as a removable storage memory 608, a read only memory 610, and a mass storage device 612, may also be included and accessible, by the processor (or processors) 604 via the bus 602.

The computer system 600 may further include a communication port 614 connected to a transport and/or transit network 622 by way of which the computer system 600 may receive network data useful in executing the methods and system set out herein as well as transmitting information and network configuration changes determined thereby. The computer system 600 may include an I/O port 616, or other device, by which information is displayed, such as at display screen 618, or information is input, such as with input device 620. The input device 620 may be alphanumeric input device, including alphanumeric and other keys for communicating information and/or command selections to the processor 604. The input device 620 may be another type of user input device including cursor control, such as a mouse, a trackball, or cursor direction keys for communicating direction information and command selections to the processors 604 and for controlling cursor movement on the display device 618. In the case of a tablet device, the input may be through a touch screen, voice commands, and/or Bluetooth connected keyboard, among other input mechanisms. The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed:

1. A method for providing a customized integrated computing environment, the method comprising:
   pre-populating, by a processor, fields of a timed interactive survey based on a bill of materials;
   receiving, by the processor, one or more user specifications through the timed interactive survey, the timed interactive survey automatically providing feedback prompting a remedy of a survey input error and interactable for a predetermined time, the survey input error including one of a missing input information, an incorrect input information, and an invalid format of input information;
   wherein the processor changes information solicited by the timed interactive survey based on inputs received in response to earlier solicitations by the timed interactive survey;
   generating, by the processor and based on the one or more user specifications, one or more configuration parameters for a customized integrated computing environment, the customized integrated computing environment comprising one or more components, the one or more components including a server;
   executing, by the processor, an automation tool to validate the one or more configuration parameters, wherein the validated one or more configuration parameters include one or more components capable of meeting the one or more user specifications;
   generating, by the processor and based on the validated one or more configuration parameters, one or more scripts for configuring the server by inserting one or more of the one or more user specifications into a template;
   deploying, by the processor, the one or more components of the validated configuration parameters; and
   executing, by the processor, the one or more scripts to configure the one or more components including the server of the customized integrated computing environment.

2. The method of claim 1, wherein the one or more scripts include configuration instructions for a network component, virtualization component, storage component, or computing component.

3. The method of claim 1, wherein the user is presented with the configuration parameters for review before generating the one or more scripts.

4. The method of claim 1, wherein a copy of the one or more scripts is stored in a central repository.

5. The method of claim 1, wherein the processor automatically populates at least one field of the configuration parameters based on the specifications.

6. The method of claim 1, wherein the processor issues an alert with a deadline for providing the specifications.

7. The method of claim 1, wherein the survey includes at least one visual cue to identify required fields.

8. One or more non-transitory tangible computer-readable storage media storing computer-executable instructions for performing a computer process on a computing system, the computer process comprising:
- pre-populating fields of a timed interactive survey based on a bill of materials;
- receiving one or more user specifications through the timed interactive survey, the timed interactive survey automatically providing feedback prompting a remedy of a survey input error, the survey input error including one of a missing input information, an incorrect input information, and an invalid format of input information;
- wherein the processor changes information solicited by the timed interactive survey based on inputs received in response to earlier solicitations by the timed interactive survey;
- generating, based on the one or more user specification, one or more configuration parameters for a customized integrated computing environment, the customized integrated computing environment comprising one or more components, the one or more components including a server;
- executing an automation tool to validate the one or more configuration parameters, wherein the validated one or more configuration parameters include one or more components capable of meeting the one or more user specifications;
- generating, based on the validated one or more configuration parameters, one or more scripts for configuring the server by inserting one or more of the one or more user specifications into a template;
- deploying the one or more components of the validated configuration parameters; and
- executing the one or more scripts to configure the one or more components including the server of the customized integrated computing environment.

9. The one or more non-transitory tangible computer-readable storage media of claim 8, wherein the one or more scripts include configuration instructions for a network component, virtualization component, storage component, or computing component.

10. A system for providing a customized integrated computing environment, the system comprising:
- a user device configured to capture customer specifications for a customized integrated computing environment through a timed interactive survey, the customized integrated computing environment comprising one or more components, the one or more components including a server component, wherein the timed interactive survey automatically provides feedback prompting a remedy of a survey input error, the survey input error including one of a missing input information, an incorrect input information, and an invalid format of input information, and wherein information solicited by the timed interactive survey is changed based on inputs received in response to earlier solicitations by the timed interactive survey; and
- one or more servers in communication with the user device over a network, the one or more servers configured to:
  - pre-populate fields of a timed interactive survey based on a bill of materials;
  - generate, based on the captured customer specifications, one or more configuration parameters for the customized integrated computing environment; and
  - execute an automation tool to validate the one or more configuration parameters, the validated one or more configuration parameters including one or more components capable of meeting the captured customer specifications;
  - generate, based on the validated configuration parameters, one or more scripts for configuring the server component by inserting one or more of the captured customer specifications into a template;
  - deploy the one or more components of the validated configuration parameters, the one or more components of the validated configuration parameters including the server component and at least one of a customized network component, a customized virtualization component, a customized storage component, and a customized computing component; and
  - configure, using the one or more scripts, the one or more components of the validated configuration parameters.

11. The system of claim 10, wherein at least one field of the configuration parameters is automatically populated based on the specifications.

12. The system of claim 10, further comprising:
- a central repository in communication with the one or more servers over the network, a copy of the one or more scripts being stored in the central repository.

* * * * *